May 12, 1970     J. R. BANNERT     3,510,905
CLEANING SYSTEM FOR AUTOMOBILE BRAKES
Filed March 14, 1968
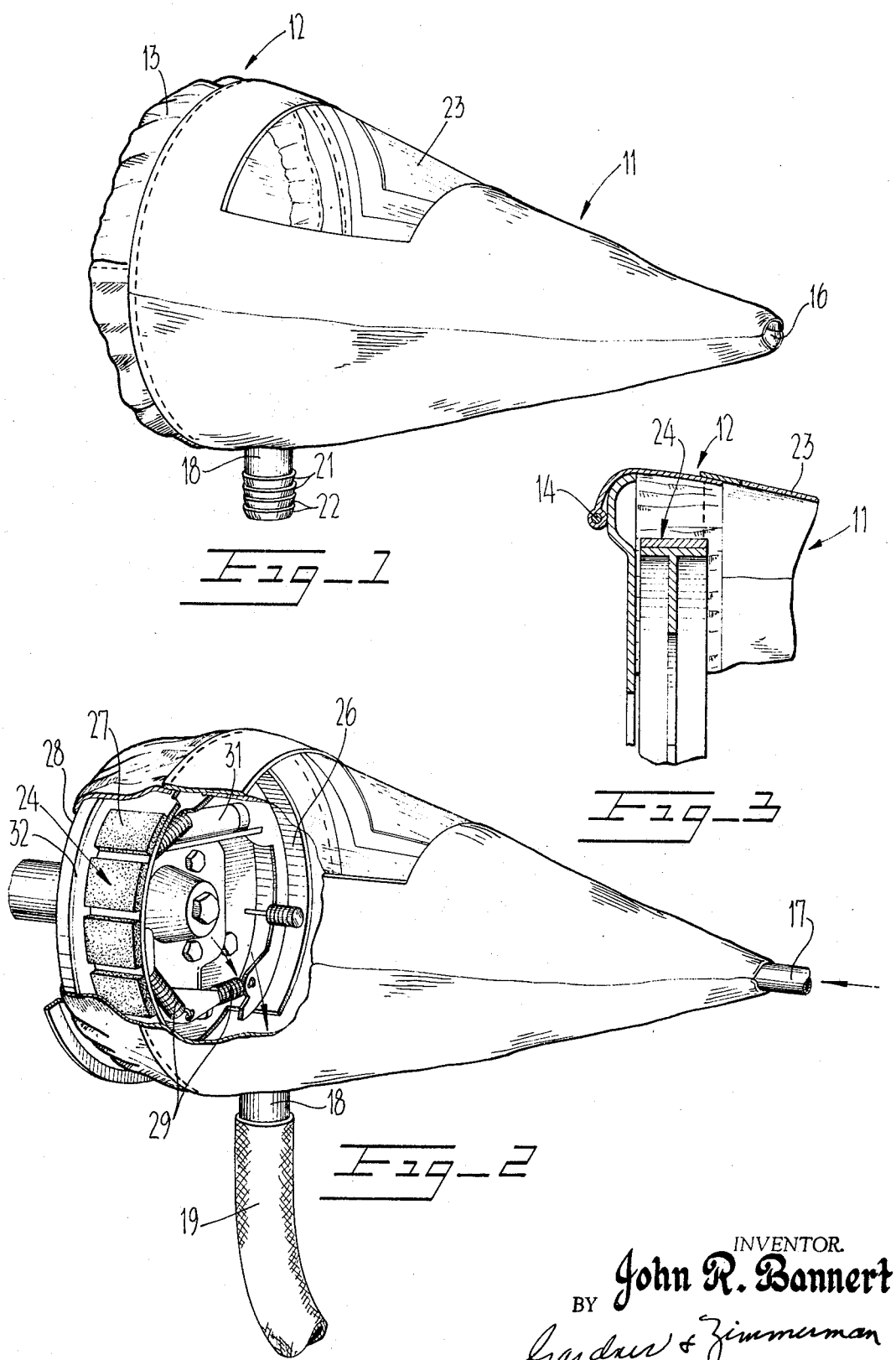
INVENTOR.
John R. Bannert
BY Gardner & Zimmerman
ATTORNEYS

United States Patent Office 3,510,905
Patented May 12, 1970

3,510,905
CLEANING SYSTEM FOR AUTOMOBILE BRAKES
John R. Bannert, 7676 Brighton Drive,
Dublin, Calif. 94566
Filed Mar. 14, 1968, Ser. No. 713,220
Int. Cl. B60s *3/00;* A47l *5/14*
U.S. Cl. 15—345
2 Claims

ABSTRACT OF THE DISCLOSURE

A cleaning system that includes a hood adapted to fit over the backing plate and linings of an automobile brake in sealing relation thereto, and having an inlet port for the sealed insertion of the barrel of an air gun and an outlet port for the attachment of a vacuum hose. Air is directed from the gun barrel into the sealed interior of the hood upon the brake assembly to remove accumulated dust and dirt, and the dust and dirt is withdrawn through the vacuum outlet port to thereby clean the brakes.

BACKGROUND OF THE INVENTION

Various systems have been devised to facilitate the easy cleaning of automobile brakes. Typically such systems include a hood adapted to be applied in sealing relation to a brake assembly, an air gun or equivalent pressurized air source coupled to the hood to direct air on the assembly and thereby dislodge dust, dirt, and other particles accumulated thereon, and a vacuum cleaner hose or other suction means communicably coupled to the hood interior to evacuate the dislodged particles therefrom. Heretofore, systems of the type outlined above have suffered from various limitations and disadvantages. In this regard, previous systems have been relatively complex and costly, particularly in the air gun arrangement. The hoods have not been suited to service with brake assemblies of different sizes and have now been collapsible to facilitate storage in a small space. Furthermore, the hoods have not been arranged to facilitate sealed atachment to the brake assembly in a simple and highly expeditious manner. Moreover, the hoods have not included provision for enabling the operator to view the brake assembly during the cleaning operation.

SUMMARY OF THE INVENTION

The present invention relates to a cleaning system for automobile brakes which is characterized by an improved cleaning hood attachment for facilitating the direction of air on a brake assembly and the evacuation of the resulting dislodged dust, dirt, and other particles from the hood interior. The hood is arranged to provide quick sealed coupling to, an uncoupling from brake assemblies of different sizes. In addition, the hood features a flexible inlet port for the sealed insertion of the barrel of an air gun in such manner that the barrel may be manipulated to direct air in all directions as may be required to dislodge dust, dirt, and other particles from the brake assembly, The hood is further arranged to permit observation of its interior such that the brake assembly may be viewed during the cleaning operation and the operator can determine when too much dust has accumulated in the hood. The hood is collapsible such that it may be stored in a relatively small space.

In the accomplishment of the foregoing, the present invention provides a conical hood of relatively soft flexible material, open at its larger end and provided thereat with an elastic rim gathered as by means of a peripheral elastic band to facilitate ready sealed coupling to, and uncoupling from brake assemblies of different sizes in encompassing relation thereto. The apex end of the hood is cut off to define a coaxial inlet port for the sealed insertion of the barrel of an air gun. By virtue of the flexibility of the hood material the inserted barrel of the air gun may be manipulated to direct air in any desired direction. The hood is provided with a nipple in communication with the hood interior at a point adjacent the elastic rim to define an outlet port for connection of a vacuum cleaner hose, or the like, whereby dislodged particles of dust, dirt, etc., are evacuated from the hood interior. A transparent window is provided in the hood wall to facilitate observation of the hood interior.

BRIEF DESCRIPTION OF THE DRAWING

FIG. 1 is a perspective view of a brake cleaning hood in accordance with the invention.

FIG. 2 is a view similar to FIG. 1, but with portions broken away and illustrating the hood in operative association with a brake assembly and an air gun barrel and vacuum cleaner hose completing the system.

FIG. 3 is a partial cross-sectional view illustrating the engagement of the hood with the backing plate of a brake assembly.

DETAILED DESCRIPTION OF THE PREFERRED EMBODIMENT

Referring to FIG. 1 in detail, a brake cleaning hood in accordance with the present invention will be seen to comprise a hollow conical body 11 formed of relatively soft, flexible material such as vinyl plastic. The base end 12 of the body is open and is provided with an annular rim member 13 secured around the open end of the body, as by stitching or the like, or otherwise formed to project axially therefrom. The rim is gathered by means of an elastic band 14 (see FIG. 2) embedded in its free end. The rim is thus yieldable to conform to different circumferences of brake linings, backing plates, etc., and to sealably engage same by virtue of the inwardly directed restoring forces generated due to the elasticity of the rim and band. The apex end of the conical body 11 is cut off in a plane normal to its axis to define an inlet port 16 for sealably receiving the barrel 17 of an air gun, or other pressurized air source. By virtue of the flexibility of the body, the port is also flexible whereby the barrel may be manipulated to direct air in all directions required to sweep the entire area of the open end 12. A nipple 18 projecting radially outward from the body 11 adjacent the open end 12 is provided to define an outlet port in communication with the body interior for connection to a vacuum cleaner hose 19, or equivalent vacuum source. More particularly, the free end of the nipple is preferably formed with a plurality of alternate peripheral circumferential ribs 21 and grooves 22, so as to provide a roughened surface to be sealably engaged by the vacuum hose 19. Finally, the body 11 is advantageously provided with a transparent window 23 of plexiglass, or the like, extending circumferentially thereof at a position spaced slightly inward from the open end 12. The window facilitates viewing of the hood, or body interior.

The manner in which the hood physically described hereinbefore is employed to clean an automobile brake assembly 24 is depicted in FIG. 2. As shown therein, the brake assembly includes a pair of brake bands 26 with linings 27 secured thereto mounted upon a backing plate 28 in the usual manner. Springs 29 and a hydraulic cylinder 31 are operatively associated with the bands 26 to effect the braking action in the conventional manner. The bands, linings, springs, cylinders, backing plate, and other parts of the brake assembly become covered with dust, dirt, particles of the lining material, etc., after extended use. Cleaning of the brake assembly is accomplished by slipping the elastic rim 13 and open end 12 of the hood body 11 over the brake band linings 27 and over the periphery of the backing plate 28. Typically, the periphery of the plate has an annular groove 32 which is engaged by the elastic band 14. In any event, the rim 13 sealably engages the periphery of the brake assembly by virtue of the resiliency or elasticity of the rim material. The air gun barrel 17 is inserted into the inlet port 16 and the vacuum cleaner hose 19 is attached to the nipple 18. Air is directed from the barrel upon the various parts of the brake assembly, appropriate manipulation of the barrel being facilitated by the flexibility of the inlet port. The particles dislodged by the directed air stream are evacuated by the vacuum cleaner hose 19. The cleaning operation is observed through the window 23, as is any untolerable accumulation of particles within the hood body necessitating its removal and cleaning of its interior. By virtue of the flexibility of the hood body material, the body may be compactly collapsed for storage in a relatively small area when not in use.

I claim:

1. A brake cleaning hood, comprising a hollow generally cone-shaped body open at its large base end and having an air inlet at its small apex end adapted to connect with an air gunbarrel or the like through which an air stream is directed toward the open end of said body generally along the axis thereof, said body being provided adjacent its large end with a radially projecting connector nipple communicating with the interior of said body and adapted to have a vacuum cleaner hose or the like attached thereto to withdraw air and dust from the hollow interior of said body, a soft flexible rim secured to and extending axially from said body at the large base end thereof and having a free circumferential edge spaced therefrom, and a substantially continuous resilient band secured to said free edge and in its unstressed condition having a smaller perimetric length than the open base end of said body so as to gather said rim about a brake assembly to effectively confine the same within said hollow body.

2. The hood according to claim 1 in which said body is provided with a transparent window generally adjacent said large base end.

References Cited

UNITED STATES PATENTS

| | | |
|---|---|---|
| 537,160 | 4/1895 | King. |
| 1,620,390 | 3/1927 | Peters _____ 15—346 |
| 2,696,666 | 12/1954 | Snead _____ 15—415 X |
| 3,222,707 | 12/1965 | Allenbaugh _____ 15—345 |

FOREIGN PATENTS

| | | |
|---|---|---|
| 108,256 | 8/1939 | Australia. |
| 744,466 | 2/1956 | Great Britain. |

ROBERT W. MICHELL, Primary Examiner

U.S. Cl. X.R.

15—415